United States Patent
Franke

(10) Patent No.: US 8,028,221 B2
(45) Date of Patent: Sep. 27, 2011

(54) ERROR CORRECTION AND ERROR DETECTION METHOD FOR READING OF STORED INFORMATION DATA AND A STORAGE CONTROL UNIT FOR THE SAME

(75) Inventor: Joerg Franke, Freiburg (DE)

(73) Assignee: Micronas GmbH, Freiburg (DE)

( * ) Notice: Subject to any disclaimer, the term of this patent is extended or adjusted under 35 U.S.C. 154(b) by 1172 days.

(21) Appl. No.: 11/715,833

(22) Filed: Mar. 7, 2007

(65) Prior Publication Data

US 2007/0256002 A1 Nov. 1, 2007

(30) Foreign Application Priority Data

Mar. 7, 2006 (DE) .................. 10 2006 010 820

(51) Int. Cl.
*H03M 13/00* (2006.01)
(52) U.S. Cl. .......................................... 714/785
(58) Field of Classification Search .......... 714/763–764, 714/767, 785
See application file for complete search history.

(56) References Cited

U.S. PATENT DOCUMENTS

| 4,569,050 | A | | 2/1986 | Ohme | 714/775 |
| 4,937,831 | A | | 6/1990 | Aoyama et al. | 714/764 |
| 5,068,856 | A | * | 11/1991 | Nagasawa et al. | 714/756 |
| 5,450,423 | A | * | 9/1995 | Iwasaki et al. | 714/767 |
| 5,608,739 | A | | 3/1997 | Snodgrass et al. | 714/785 |
| 5,745,508 | A | * | 4/1998 | Prohofsky | 714/766 |
| 7,076,722 | B2 | | 7/2006 | Shibata | 714/763 |
| 7,761,780 | B2 | * | 7/2010 | Kanai | 714/805 |

FOREIGN PATENT DOCUMENTS

WO WO 98/19241 A 5/1998

OTHER PUBLICATIONS

Tseng et al., High order perceptrons for decoding ECC, 1992, IEEE, p. III-24 to III-29.*
Gaitanis et al., The design of TSC error C/D circuits for ESC/DED codes, Mar. 1988, IEEE Trans. on. computers, vol. 37, No. 3, p. 258-256.*
Fujiwara et al., Error control coding in computers, Jul. 1990, IEEE, p. 63-72.*

* cited by examiner

*Primary Examiner* — Shelly A Chase
(74) *Attorney, Agent, or Firm* — Muncy, Geissler, Olds & Lowe, PLLC

(57) ABSTRACT

An error correction and/or error detection method reads of stored information data from a storage device; wherein in addition to the information data, code data is read from the storage device. Syndrome data is formed from the information data and the code data in order to determine errors and/or error positions in the read data. For detection of multiple errors, it is verified whether in the case of a determined error position, the information data or code data associated with the relevant storage positions are either all equal to 0, or are all equal to 1.

11 Claims, 1 Drawing Sheet

ERROR CORRECTION AND ERROR DETECTION METHOD FOR READING OF STORED INFORMATION DATA AND A STORAGE CONTROL UNIT FOR THE SAME

TECHNICAL FIELD

The invention relates to an error correction and error detection method for reading of stored information data and code data from a storage device, and to a storage control unit for the realization of such a method.

BACKGROUND

Error correction and error detection methods are known which are used to increase the reliability of the operation of storage devices, for example DRAM (Dynamic Random Access Memory), SRAM (Static Random Access Memory), flash or EEPROM (Electrically Erasable Programmable Read-Only Memory) devices deployed in computers or in embedded systems. Such methods are usually based on EC/ED (EC: Error Correction, ED: Error Detection) codes for error correction and error detection.

A similar error correction and error detection method is based on known fundamental principles, such as those described by Richard W. Hemming: Error Detecting and Error Correcting Code, Bell System Technical Journal 29 (2): pp. 147-160, 1950. In order to secure, for example, n bit data with single bit error correction (SEC, single bit error correction), $1+\log_2 n$ code bits are required. For a so called double bit error detection (DED, Double Bit Error Detection), an extension by another bit is required. SEC/DED will thus together require $(2+\log_2 n)$ code bits.

It is assumed that the probability that of the occurrence of each of the two possible errors, that is to say in the case of a storage process in a computer, an error resulting in 0 instead 1 or in 1 instead of 0, is always about the same.

This type of error correction and error detection is illustrated by FIG. 1, which shows 8 information data items D1-D8 to be stored in addition to 5 code data items C0-C4 so as to form one data word which is stored with a total of 13 bits. In this example, the code data value designated with C0 is used for DED.

For the information data D (8:1) to be stored, code data C (4:1) is determined according to $$D1 \times D2 \times D4 \times D5 \times D7 \rightarrow C1,$$

$$D1 \times D3 \times D4 \times D6 \times D7 \rightarrow C2,$$

$$D2 \times D3 \times D4 \times D8 \rightarrow C3 \text{ and}$$

$$D5 \times D6 \times D7 \times D8 \rightarrow C4, \qquad (1)$$

wherein the combination symbol "x" designates an evaluation of the data values D1-D8 of the information data D (8:1) to be stored as an X-OR combination. The status of the individual data values D1-D8 to be stored is in this case evaluated so that it is either determined whether an even parity exists, or determined whether an uneven parity exists. The DED code data value C0 is determined according to $$D1 \times D2 \times D3 \times D4 \times D5 \times D6 \times D7 \times D8 \rightarrow C0. \qquad (2)$$

For the information data D(8:1) and code data C(4:1) read from a storage device, a syndrome S(4:1) having syndrome data values S1-S4 is determined according to $$C1 \times D1 \times D2 \times D4 \times D5 \times D7 \rightarrow S1,$$

$$C2 \times D1 \times D3 \times D4 \times D6 \times D7 \rightarrow S2,$$

$$C3 \times D2 \times D3 \times D4 \times D8 \rightarrow S3 \text{ and}$$

$$C4 \times D5 \times D6 \times D7 \times D8 \rightarrow S4, \text{ as well as} \qquad (3)$$

$$C0 \times D1 \times D2 \times D3 \times D4 \times D5 \times D6 \times D7 \times D8 \rightarrow S0. \qquad (4)$$

According to this method, the first four code data values C1-C4 and the first four syndrome data values S1-S4 are used for SEC, and the code and syndrome data values C0, S0 are used for DED. If the syndrome data values S0-S4 equal the value 0 in all 5 bits of the syndrome S(4:1, 0), no error has occurred during the storage and reading of the information data D(8:1). In the case of a single error, the first four SEC syndrome data S(4:1) indicate the position of the defective bit in the read data word (D(8:1), C(4:1)) and the DED syndrome data value S0 equals 1. In this case, the positions SP within the read data word (D(8:1), C(4:1)) in the row after the individual code data values and information data values are arranged in the sequence C1, C2, D1, C3, D2, D3, D4, C4, D5, D6, D7, D8. In the case of a double error, at least one bit of the SEC syndrome data S (4:1) is not equal to 0, while the DED syndrome data value S0 is equal to zero.

Such a method makes it possible to ensure in an advantageous manner that an error will be detected in a storage device during the reading of data from a storage device, and that it can be also corrected in the case of a single bit error.

A disadvantage in this case, however, is the requirement of significantly increased storage, which is needed not only for the information data values, but in addition also to secure the code data values. Increased computing resources are also required in order to determine the code data or the syndrome data. The determination of the code data and of the syndrome data is usually converted by means of coding and decoding hardware, which is a constituent part of a storage control unit.

SUMMARY

An object of embodiments of the invention is to propose an error correction and error detection method for reading of stored information data from a storage device, which requires a limited extent of processing resources and thus preferably also a limited amount of hardware resources. Such a method should in particular enable detection of double-bit errors. In addition, a storage device arrangement is proposed, which realizes such a method.

This object is achieved by an error correction and error detection method, and by a storage device arrangement having the characteristics of embodiments of the invention.

According to a preferred embodiment, an error correction and/or error detection method is provided for reading of stored information data from a storage device, wherein in addition to the information data, code data is read from the storage data, and syndrome data is generated from the information data and from the code data in order to determine errors and/or error positions in the read data, wherein in the detection of multiple errors, it is determined whether, in the case of detected error positions, the storage positions associated with the information data or with the code data are either all equal to 0, or are all equal to 1.

The reading from a storage device is preferably performed using a storage device having a low probability that "1" will be stored instead of "0" in comparison to the probability that "0" value will be stored erroneously instead of "1", or vice versa. The probability of an error in a certain possible value state is preferably low with regard to another value state, which should be in particular understood as a significant difference in the frequency of errors, namely to a negligible extent in one of both possible cases.

For at least a double-error correction option with a single-error correction option, n information data values of the code data values of the information data are associated with the code data of the information data in the storage device.

In the case of a verification of the detected value "1" in a detected error position, according to a preferred embodiment, a multiple error, in particular a double error, is present.

According to a preferred arrangement, code data values are assigned at least to the storage positions 1, 2, 4 and 8, and information data values are in this case assigned at least to the storage positions 3, 5 through 7 and 9 through 12.

The syndrome data can be compared with associated parity bits of the corresponding storage positions as the code data.

The code data are determined according to $$D1 \times D2 \times D4 \times D5 \times D7 \rightarrow C1,$$

$$D1 \times D3 \times D4 \times D6 \times D7 \rightarrow C2,$$

$$D2 \times D3 \times D4 \times D8 \rightarrow C3 \text{ and}$$

$$D5 \times D6 \times D7 \times D8 \rightarrow C4, \quad (1)$$

and the syndrome data (S (4:1) are determined according to $$C1 \times D1 \times D2 \times D4 \times D5 \times D7 \rightarrow S1,$$

$$C2 \times D1 \times D3 \times D4 \times D6 \times D7 \rightarrow S2,$$

$$C3 \times D2 \times D3 \times D4 \times D8 \rightarrow S3 \text{ and}$$

$$C4 \times D5 \times D6 \times D7 \times D8 \rightarrow S4. \quad (3)$$

It is preferable that to employ a storage device having an asymmetrical error performance.

In addition to the method, a storage arrangement is provided, having a storage device and a storage control unit enabling, at least, reading of information data and of code data associated with the information data, wherein the storage control unit is designed and/or controlled to realize the above-described error correction and/or error detection method. The storage device is in this case preferably provided as a storage device which has an asymmetrical error performance.

The method and the storage arrangement are based on the idea to utilize the probability of an asymmetrical occurrence of both possible errors, that is to say 0 instead of 1, or 1 instead of 0, which occurs with some types of storage devices, in order to save storage space. One bit of code data can be thus saved, without really reducing the operational reliability, when one of these probabilities is negligible when compared to the other one.

A SEC-DED solution can be then provided for example only with $(1+\log_2 n)$ code bits. It is advantageous when the coding and decoding hardware is also used sparingly, which would otherwise be required for the calculation of the special DED code data values C0, or of the DED syndrome data values in order to generate or verify these bits.

In many EEPROM or flash storage devices, the probability of an erroneous 1, that is to say 1 instead of 0, is negligibly small, when compared to the probability of an erroneous 0, that is to say 0 instead of 1. Accordingly, only 4 bit codes or code data values are required in this case for 8 bit data or information data values. The 4-bit SEC code C (4:1) is formed first for the SEC according to a known manner for the 8 bit data values of the information data after they have been read from the storage device. However, another DED code data value C0 is no longer required for DED, that is to say a parity bit is not required for all data.

In order to detect a double error, one has to simply verify that all the found error positions in all the data values that have been read (D(8:1), C(4:1)) also contained a 0. If at least one 1 is found, this means that a multiple error is present. Double errors are detected with reliability with such a procedure. Detection of triple or more errors is also possible.

The following is an explanation of an embodiment which is based on the attached figures.

DETAILED DESCRIPTION

Figure 2:
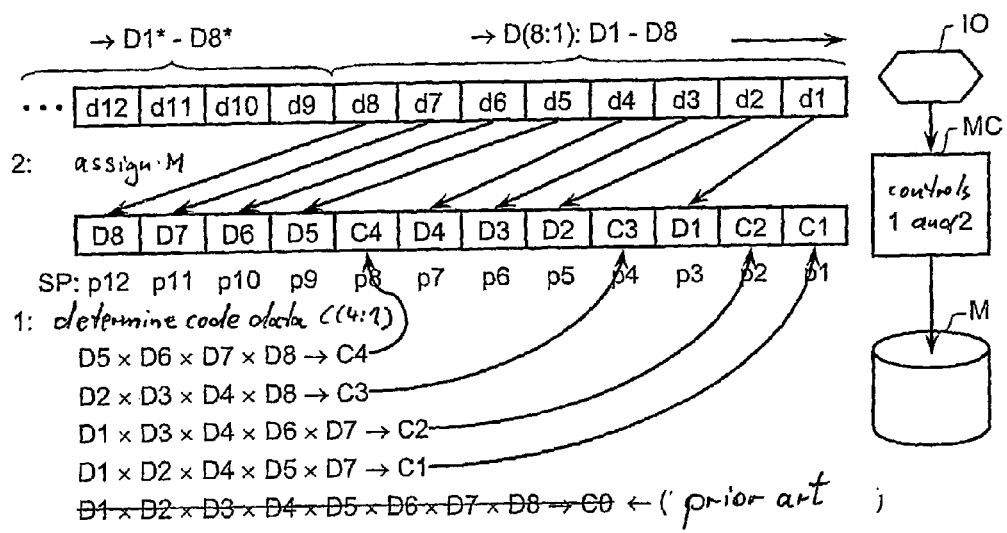
FIG. 2 shows information data and code data, as well as an instruction for the encryption method during the storage in a storage device.

As one can from FIG. 2, a sequence of information data d1, d2, d3, . . . d12, . . . , from an input and/or output device 10 is to be stored in a storage device M. In order to differentiate between the codes to ensure that this storage data d1, . . . d12 will be stored as the proper data or as user data to be stored, the data is stored as information data D(8:1), which is indicated with the individual data values D1-D8, D1*-D8*, and data forming a code is stored as code data C(4:1), which is indicated with the code data values C1-C4. The individual codes correspond in this case to each bit. After the reading from the memory device M, syndrome data values S1-S4 are formed as syndrome data S(4:1), wherein each value is formed with one bit.

A variation of the procedure or a realization of the developed hardware can be achieved in a customary manner, so that for example, instead of using 8 bits in each case, a higher or lower number of bits are used with a correspondingly arranged quantity of code data to be processed.

For the information data D(8:1) to be stored the code data C(4:1) is determined according to $$D1 \times D2 \times D4 \times D5 \times D7 \rightarrow C1,$$

$$D1 \times D3 \times D4 \times D6 \times D7 \rightarrow C2,$$

$$D2 \times D3 \times D4 \times D8 \rightarrow C3 \text{ and}$$

$$D5 \times D6 \times D7 \times D8 \rightarrow C4, \quad (1)$$

wherein the logic symbol "x" designates an evaluation of the data values D1-D8 of the information data D(8:1) to be stored.

In this case, the status of the individual data values D1-D8 of the information data D(8:1) to be stored is evaluated so that it is detected whether an even parity exists, or whether an uneven parity exists.

In the case of the determination of whether an even parity exists, it is determined whether all the n positions have an even number of 1s. In the case of an uneven parity, it is determined whether an uneven number of 1s exists.

Figure 1:
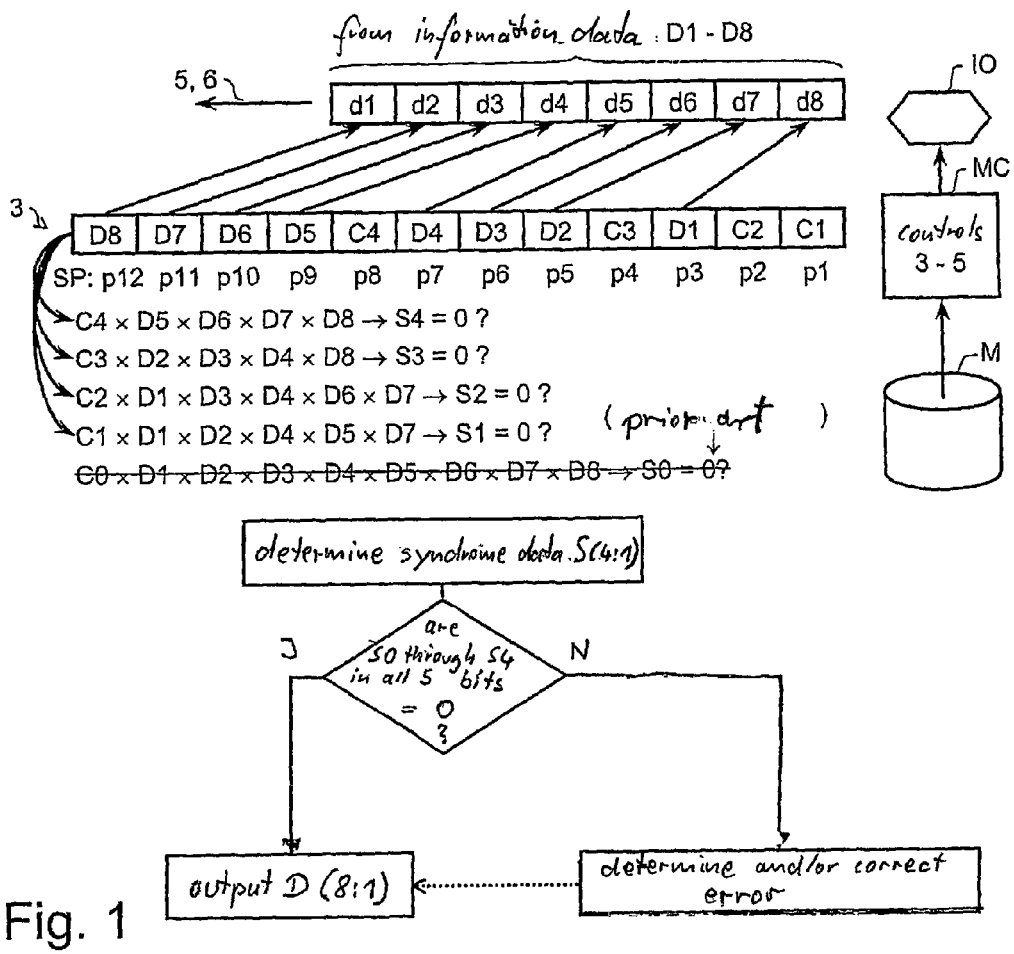
FIG. 1 is a schematic representation of the data values of information data and code data which is read from a storage device, and of the steps of the method used for the determination of a possible error.

For the information data D(8:1) and code data C(4:1), which is read from the memory device as is schematically illustrated by FIG. 1, a syndrome S(4:1) having syndrome values S1-S4 is determined according to $$C1 \times D1 \times D2 \times D4 \times D5 \times D7 \rightarrow S1,$$

$$C2 \times D1 \times D3 \times D4 \times D6 \times D7 \rightarrow S2,$$

$$C3 \times D2 \times D3 \times D4 \times D8 \rightarrow S3 \text{ and}$$

$$C4 \times D5 \times D6 \times D7 \times D8 \rightarrow S4 \quad (3)$$

The logic preferably carried out again using a type of a parity verification using even or uneven parity according to the parity type which was selected for the coding.

Assuming a negligibly small probability of the occurrence of an erroneous 1 when compared to the probability of the occurrence of an erroneous 0, a special code value C0 for the DED is not required. For the SEC, that is to say the detection of a single-bit error in the information data D(8:1) and/or the code data C(4:1) which is read from the storage device M, a syndrome having syndrome data S(4:1) is generated in a known manner for these read data values D1-D8, C1-C4 according to the equation (3). The operation is performed again by means of parity verification. If all 4 syndrome values S1-S4 are equal to 0, no error is present. In the case of a simple error, the position of 1 in the SEC-syndrome data (S(4:1) indicates the position of the erroneous bit in the read data word (D(8:1), C(4:1)) according to a manner and type that is per se known.

According to a preferred procedure, it is also verified whether all the found trigger positions in the read data word (D1-D8, C(4:1)) contain a 0. If at least one value with 1 is found, this means that a multiple error is present. Moreover, the positions SP are within the read data word (D(8:1), C(4:1)) in the row after the individual code data values and information data values allocated in the row sequence: C1, C2, D1, C3, D2, D3, D4, C4, D5, D6, D7, D8. A modification of a known procedure is therefore assumed with respect to the detection of a double error.

In order to process information data and code data according to a similar error correction and error detection method, the read information values D1-D8 are supplied from the input and/or output device IO to a storage control unit MC. The storage control unit MC determines in a first method step 1 the code data C(4:1) for the information data D (8:1) and assigns the information data values D1-D8 and the code data values C1-C4 to the storage device M in a known manner. The assignment is performed using equation (1) in the sequence of the code or information data values C1, C2, D1, C3, D2, D3, D4, C4, D5, D6, D7, D8. When another arrangement of the information data D(8:1) to the code data C(4:1) is used, it is optionally also possible to select another sequence for the assignment of the storage locations in the storage device M.

For the read operation, the information data D(8:1) and code data C(4:1), which has been stored in his manner, is read from the storage device M and supplied to the storage device control unit MC, which determines the syndrome data in a third method step. After that, the store control unit MC performs, in a fourth method step 4, a parity comparison and thereby determines whether an error is present or not. In the case of a single-bit error, it is verified in the consequent sixth method step 6 whether in the data word (D(8:1), C(4:1)) read from the information data D(8:1) and the code data (C(4:1) at least 1 data value is equal to 1 in order to detect a double- or multiple-bit error. Thereafter, in a seventh method step 7, the error is determined and/or corrected. If no error is present, the information data values D1-D8 are output in a subsequent method step 5 as information data D (8:1). The output can be realized in another entity in the same processor, and/or in an input and or/output device IO.

I claim:

1. An error correction and/or error detection method for reading of information data stored in a storage device, wherein in addition to information data, code data is read from the memory device, the method comprising:

forming syndrome data from the information data and the code data in order to determine errors and/or error positions in the read data;

detecting multiple errors by verifying whether, in the case of detected error positions, the information associated with their storage position or code data all have the same binary value; and comparing the syndrome data to corresponding associated parity bits of storage positions as the code data.

2. The method according to claim 1, wherein the probability of an erroneously stored value "1" and the probability of an erroneously stored value "0" are substantially different.

3. The method according to claim 1, wherein detecting multiple errors further comprises identifying a value "1" in a determined error position.

4. The method according to claim 1, wherein code data values are assigned at least to storage positions 1, 2, 4, and 8 and information data values are assigned at least with the storage positions 3, 5 through 7 and 9 through 12.

5. The method according to claim 1, wherein the storage device has an asymmetric error performance.

6. The method according to claim 1, wherein, depending on a type of the data having particular high reliability requirement, an additional code data value and an additional syndrome data value are optionally employed.

7. An error correction and/or error detection method for reading of information data stored in a storage device, wherein in addition to information data, code data is read from the memory device, the method comprising:

forming syndrome data from the information data and the code data in order to determine errors and/or error positions in the read data; and detecting multiple errors by verifying whether, in the case of detected error positions, the information associated with their storage position or code data all have the same binary value, wherein the probability of a storage error for a certain possible value state is small compared to another value state.

8. An error correction and/or error detection method for reading of information data stored in a storage device, wherein in addition to information data, code data is read from the memory device, the method comprising:

forming syndrome data from the information data and the code data in order to determine errors and/or error positions in the read data; and detecting multiple errors by verifying whether, in the case of detected error positions, the information associated with their storage position or code data all have the same binary value, wherein for at least a double-error detection with at least a single-error correction possibility, n information data values of information data, 1+log 2n code values of the code data are assigned to the information data in the storage device.

9. An error correction and/or error detection method for reading of information data stored in a storage device, wherein in addition to information data, code data is read from the memory device, the method comprising:

forming syndrome data from the information data and the code data in order to determine errors and/or error positions in the read data; and detecting multiple errors by verifying whether, in the case of detected error positions, the information associated with their storage position or code data all have the same binary value, wherein the code data are determined according to $$D1 \times D2 \times D4 \times D5 \times D7 \rightarrow C1,$$

$$D1 \times D3 \times D4 \times D6 \times D7 \rightarrow C2,$$

$$D2 \times D3 \times D4 \times D8 \to C3,$$

$$D5 \times D6 \times D7 \times D8 \to C4,$$

wherein Dx represents the xth value of the information data and Cx represents the xth value of the code data, and the syndrome data are determined according to $$C1 \times D1 \times D2 \times D4 \times D5 \times D7 \to S1,$$

$$C2 \times D1 \times D3 \times D4 \times D6 \times D7 \to S2,$$

$$C3 \times D2 \times D3 \times D4 \times D8 \to S3,$$

$$C4 \times D5 \times D6 \times D7 \times D8 \to S4,$$

wherein Sx represents the xth value of the syndrome data.

10. A storage device arrangement, comprising
a storage device storing information data and code data associated with the information data; and
a storage control unit configured to enable reading of the information data and the code data, the storage control unit further configured to
form the syndrome data from the information data and the code data in order to determine errors and/or error positions in the read data,
detect multiple errors by verifying whether, in the case of detected error positions, the information data associated with their storage position or code data all have the same binary value,
wherein the syndrome data is compared to corresponding associated parity bits of storage positions as the code data.

11. A storage device arrangement according to claim 10, wherein the storage device is characterized by an asymmetric error performance.

* * * * *